(12) United States Patent
Schlueter et al.

(10) Patent No.: US 7,161,966 B2
(45) Date of Patent: Jan. 9, 2007

(54) SIDE-PUMPED FIBER LASER

(75) Inventors: Holger Schlueter, Princeton, NJ (US); Rolf Biekert, Farmington, CT (US)

(73) Assignee: Trumpf, Inc., Farmington, CT (US)

( * ) Notice: Subject to any disclaimer, the term of this patent is extended or adjusted under 35 U.S.C. 154(b) by 368 days.

(21) Appl. No.: 10/763,392

(22) Filed: Jan. 26, 2004

(65) Prior Publication Data

US 2004/0233942 A1 Nov. 25, 2004

Related U.S. Application Data

(60) Provisional application No. 60/442,122, filed on Jan. 24, 2003.

(51) Int. Cl.
H01S 3/30 (2006.01)

(52) U.S. Cl. .......................................... 372/6
(58) Field of Classification Search .................. 372/6, 372/69, 70, 75
See application file for complete search history.

(56) References Cited

U.S. PATENT DOCUMENTS

| | | | |
|---|---|---|---|
| 4,815,079 A * | 3/1989 | Snitzer et al. ................. | 372/6 |
| 4,829,529 A | 5/1989 | Kafka | |
| 4,950,318 A * | 8/1990 | Dyott .......................... | 65/403 |
| 5,033,058 A * | 7/1991 | Cabaret et al. ............... | 372/75 |
| 5,212,707 A | 5/1993 | Heidel et al. | |
| 5,418,880 A | 5/1995 | Lewis et al. | |
| 5,566,196 A | 10/1996 | Scifres | |
| 5,627,848 A | 5/1997 | Fermann et al. | |
| 5,636,239 A * | 6/1997 | Bruesselbach et al. ........ | 372/70 |
| 5,640,408 A * | 6/1997 | Jani et al. .................... | 372/41 |
| 5,694,408 A | 12/1997 | Bott et al. | |
| 5,710,786 A | 1/1998 | Mackechnie et al. | |
| 5,790,720 A | 8/1998 | Marcuse et al. | |
| 5,805,621 A | 9/1998 | Grubb et al. | |
| 5,818,630 A | 10/1998 | Fermann et al. | |
| 5,854,865 A * | 12/1998 | Goldberg ..................... | 385/31 |
| 5,864,645 A | 1/1999 | Zellmer et al. | |
| 5,867,305 A | 2/1999 | Waarts et al. | |
| 5,880,877 A | 3/1999 | Fermann et al. | |
| 5,887,009 A | 3/1999 | Garrett et al. | |
| 5,905,745 A | 5/1999 | Grubb et al. | |
| 5,923,694 A * | 7/1999 | Culver ......................... | 372/69 |
| 5,933,271 A | 8/1999 | Waarts et al. | |
| 5,999,673 A * | 12/1999 | Valentin et al. ............... | 385/43 |
| 6,031,849 A | 2/2000 | Ball et al. | |
| 6,038,244 A * | 3/2000 | Usui et al. .................... | 372/75 |
| 6,049,415 A | 4/2000 | Grubb et al. | |
| 6,075,803 A * | 6/2000 | Bull et al. .................... | 372/75 |
| 6,101,199 A | 8/2000 | Wang et al. | |
| 6,151,338 A | 11/2000 | Grubb et al. | |
| 6,157,763 A | 12/2000 | Welch et al. | |

(Continued)

FOREIGN PATENT DOCUMENTS

DE 195 35 526 4/1997

(Continued)

*Primary Examiner*—Tan Ho
*Assistant Examiner*—Leith A. Al-Nazer
(74) *Attorney, Agent, or Firm*—Fish & Richardson P.C.

(57) ABSTRACT

An optical fiber includes a radial axis, a longitudinal axis, a first window surface adapted for receiving pump radiation and transmitting the pump radiation into the optical fiber, a second surface adapted for totally internally reflecting pump radiation received within the optical fiber, and an active region within the optical fiber for generating radiation at a characteristic wavelength when pumped with pump radiation. A normal direction of the first window surface is not parallel to a direction of the radial axis at the first window surface.

26 Claims, 11 Drawing Sheets

U.S. PATENT DOCUMENTS

| | | | |
|---|---|---|---|
| 6,160,568 A | 12/2000 | Brodsky et al. | |
| 6,181,466 B1 | 1/2001 | Franzoso et al. | |
| 6,275,250 B1 | 8/2001 | Sanders et al. | |
| 6,275,512 B1 | 8/2001 | Fermann | |
| 6,288,835 B1 | 9/2001 | Nilsson et al. | |
| 6,301,421 B1 | 10/2001 | Wickham et al. | |
| 6,324,326 B1 | 11/2001 | Dejneka et al. | |
| 6,330,382 B1 | 12/2001 | Harshbarger et al. | |
| 6,347,007 B1 | 2/2002 | Grubb et al. | |
| 6,370,297 B1 * | 4/2002 | Hakimi et al. | 385/27 |
| 6,594,299 B1 * | 7/2003 | Hirano et al. | 372/75 |
| 6,608,852 B1 * | 8/2003 | Govorkov et al. | 372/75 |
| 6,621,849 B1 * | 9/2003 | Thro et al. | 372/99 |
| 6,697,409 B1 * | 2/2004 | Sekiguchi | 372/69 |
| 6,704,341 B1 * | 3/2004 | Chang | 372/70 |
| 6,704,479 B1 * | 3/2004 | Koplow | 385/31 |
| 6,721,347 B1 * | 4/2004 | Mizui et al. | 372/75 |
| 6,865,213 B1 * | 3/2005 | Perry et al. | 372/72 |
| 6,975,791 B1 * | 12/2005 | Neuberger | 385/27 |
| 2002/0054740 A1 | 5/2002 | Vakili et al. | |
| 2002/0197037 A1 | 12/2002 | Kersey et al. | |
| 2005/0281508 A1 * | 12/2005 | Krupkin et al. | 385/36 |
| 2006/0002435 A1 * | 1/2006 | Kim | 372/6 |

FOREIGN PATENT DOCUMENTS

| | | | |
|---|---|---|---|
| DE | 196 20 159 | | 11/1997 |
| DE | 199 05 491 | | 8/1999 |
| DE | 198 29 684 | | 1/2000 |
| DE | 199 25 686 | | 12/2000 |
| DE | 199 64 083 | | 7/2001 |
| DE | 100 06 050 | | 8/2001 |
| DE | 100 09 379 | | 9/2001 |
| DE | 100 09 380 | | 9/2001 |
| DE | 100 09 381 | | 9/2001 |
| DE | 100 59 314 | | 6/2002 |
| DE | 102 11 352 | | 9/2002 |
| EP | 0 802 592 | | 10/1997 |
| EP | 0 840 411 | | 5/1998 |
| EP | 0 980 122 | | 2/2000 |
| EP | 1 191 372 | | 3/2002 |
| EP | 1 213 802 | | 6/2002 |
| EP | 1 213 802 A2 * | | 6/2002 |
| GB | 2309820 | | 8/1997 |
| GB | 2335074 | | 9/1999 |
| GB | 2366447 | | 3/2002 |
| WO | WO 95/10868 | * | 4/1995 |
| WO | WO 95/10869 | | 4/1995 |
| WO | WO 96/20519 | | 7/1996 |
| WO | WO 97/39503 | | 10/1997 |
| WO | WO 99/45419 | | 9/1999 |
| WO | WO 01/24326 | | 4/2001 |
| WO | WO 02/11255 | | 2/2002 |
| WO | WO 02/31552 | | 4/2002 |

* cited by examiner

SIDE-PUMPED FIBER LASER

CLAIM OF PRIORITY

This application claims priority under 35 USC §119(e) to U.S. Patent Application Ser. No. 60/442,122, filed on Jan. 24, 2003, the entire contents of which are hereby incorporated by reference.

TECHNICAL FIELD

This invention relates to lasers and, and more particularly to side-pumped fiber lasers.

BACKGROUND

For many applications of diode pumped fiber lasers (e.g., material processing such as cutting and welding of metals) continuous wave ("cw") high-power and high beam quality (near the diffraction limit) are necessary. The fiber geometry is well suited for high-power, multi-kilowatt ("kW") operation, because the excessive heat can be efficiently removed over the length of the fiber due to the long, thin geometry of the fiber, which allows heat removal from a fiber at a higher rate than from a bulk solid-state laser.

Fiber lasers must be pumped by an external energy source to generate radiation, and, because of the finite efficiency of a fiber laser, the external energy source must supply more power than is emitted from the fiber laser. Thus, efficient and economical coupling of pump energy into the active region of a fiber laser is desirable.

Many solid state lasers have an output wavelength between about 1–2 μm. Lasers with such an output wavelength may be doped with a dopant, such as, for example, Nd, Er, Yb, and Vn. Therefore, the following description assumes a wavelength in this order when describing a fiber laser. However, in the case that the output wavelength differs from this assumption, dimensions of the laser are scaled appropriately with the output wavelength.

In general, a double clad fiber laser typically consists of a single-mode core for guiding the output laser radiation, which is embedded in a multi-mode waveguide region for guiding the pump laser radiation. The multi-mode waveguide region may be embedded in an outer cladding. The multi-mode cladding is on the order of several ten to several hundred micrometers in diameter and carries the light from one or more pump diodes that are distributed, and coupled in, along the side of the fiber ("side-pumped fiber laser") or are all located at the two ends of the fiber ("end-pumped fiber laser").

The active regions are smaller in diameter than the cladding regions and carry the lasing dopant. The dopant absorbs radiation at the pump wavelength and creates gain at the output laser wavelength. Pump laser radiation should efficiently penetrate both the multi-mode waveguide region and the active regions to pump the active region.

In order to achieve cw output power on the order of multi-kW, pump power greater than the output power must be absorbed by the active region of the fiber laser. Typically, the pump power is generated by high-power diode lasers. Single-emitter diode laser devices reach cw output powers of 5 Watts. Thus, several hundred, or even thousands, of the single-emitter devices must be efficiently coupled into the fiber laser for multi-kW output powers. However, individual contacting, holding, and fiber coupling thousands of single-emitter devices is difficult and expensive.

Therefore, high-power diode laser arrays, which combine multiple emitters in a single device and yield total output powers of 50 Watts or more, may be chosen to pump high-power solid state lasers. The output aperture of such an array is typically 10 mm×1 μm with a beam divergence along the long axis of about 5–10° and a divergence in the small axis of about 40–70°. While the higher output power of a diode laser array is advantageous over a single emitter device, the highly astigmatic output beam of the array effectively prohibits fiber coupling of such devices without complicated additional optics (so-called microoptics). Even with microoptics, fiber coupling of diode laser arrays is difficult.

SUMMARY

A native window can be created in an optical fiber through which pump light for pumping a active region of the fiber can be transmitted. The window can be positioned such that the pump light transmitted through the window is totally internally reflected within the fiber.

In a first general aspect, an optical fiber includes a radial axis, a longitudinal axis, a first window surface adapted for receiving pump radiation and transmitting the pump radiation into the optical fiber, a second surface adapted for totally internally reflecting pump radiation received within the optical fiber, and an active region within the optical fiber for generating radiation at a characteristic wavelength when pumped with pump radiation. A normal direction of the first window surface is not parallel to a direction of the radial axis at the first window surface.

In a second general aspect, a fiber laser assembly includes an optical fiber, a diode laser array adapted for emitting pump radiation, and an optical element disposed between the diode laser array and the guiding the pump radiation from the diode laser array to the optical fiber. The optical fiber includes a radial axis, a longitudinal axis, a first window surface adapted for receiving the pump radiation and transmitting the pump radiation into the optical fiber, a second surface adapted for totally internally reflecting pump radiation received within the optical fiber, and an active region within the optical fiber for generating radiation at a characteristic wavelength when pumped with pump radiation. A normal direction of the first window surface is not parallel to a direction of the radial axis at the first window surface. The optical element is further adapted for guiding the pump radiation from the diode laser array to the first surface of the optical fiber.

Implementations may include one or more of the following features. For example, an angle between the normal direction of the first window surface and the direction of the radial axis at the first window surface can be greater than about 15 degrees, greater than about 45 degrees, or greater than about 60 degrees. The normal direction of the first window surface can be substantially perpendicular to the direction of the radial axis at the first window surface. The first window surface can be substantially parallel to the longitudinal axis of the optical fiber, and the first window surface can be substantially flat.

An angle between a normal direction of the second surface and a direction of the radial axis at the second surface can be less than about 30 degrees. A normal direction of the second surface can be substantially parallel to a direction of the radial axis at the second surface. The second surface can be curved.

The optical fiber can further include a third window surface having a normal direction that is not parallel to a direction of the radial axis at the third window surface, where the third window surface is adapted for receiving pump radiation. The third window surface can be substantially flat.

The active region can have a transverse dimension smaller than the characteristic wavelength.

In a third general aspect, a method of pumping a fiber laser having a longitudinal axis, a radial axis, and an azimuthal axis includes producing a beam of pump radiation, and injecting the beam of pump radiation into the fiber laser in a direction such that the beam of pump radiation has a component along the longitudinal axis, the radial axis, and the azimuthal axis of the fiber laser.

Implementations may include one or more of the following features. The fiber laser can have a window surface having a normal direction that is not parallel to a direction of the radial axis at the first window surface, and the beam of pump radiation can be injected into the fiber laser through the first window surface. The beam of pump radiation can be produced by a diode laser array.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION

To couple pump radiation from a high-power laser array into the active region of a fiber laser, a cross-section for the fiber may be selected that has at least one planar surface (i.e., a fiber-native window). Such a planar surface allows efficient coupling of the output laser beam from the high-power diode laser array into the fiber laser without shaping the beam from the array with micro-optics. The radiation of the laser array can be injected through the fiber-native window almost tangentially to a curved fiber surface of the fiber. The laser array radiation can also be injected such that the pump light within the fiber has a substantial component along the longitudinal direction of the fiber. The magnitude of the longitudinal component is determined by the angle of injection $\alpha_i$, defined as the angle between the longitudinal fiber axis and the incident pump beam axis outside the fiber. Because the pump light is injected typically from air into a fiber material having an index of refraction greater than that of air, the angle of propagation, $\alpha_p$, will typically be larger than the angle of injection. The angle of propagation is defined as the angle between the helical propagation path of the pump light in the fiber and the axis of the fiber. Because of the substantial longitudinal component of the pump beam within the fiber laser and the large divergence along the fast axis of the beams, the existence of local modes of the pump light within the fiber laser is unlikely.

Figure 1A:
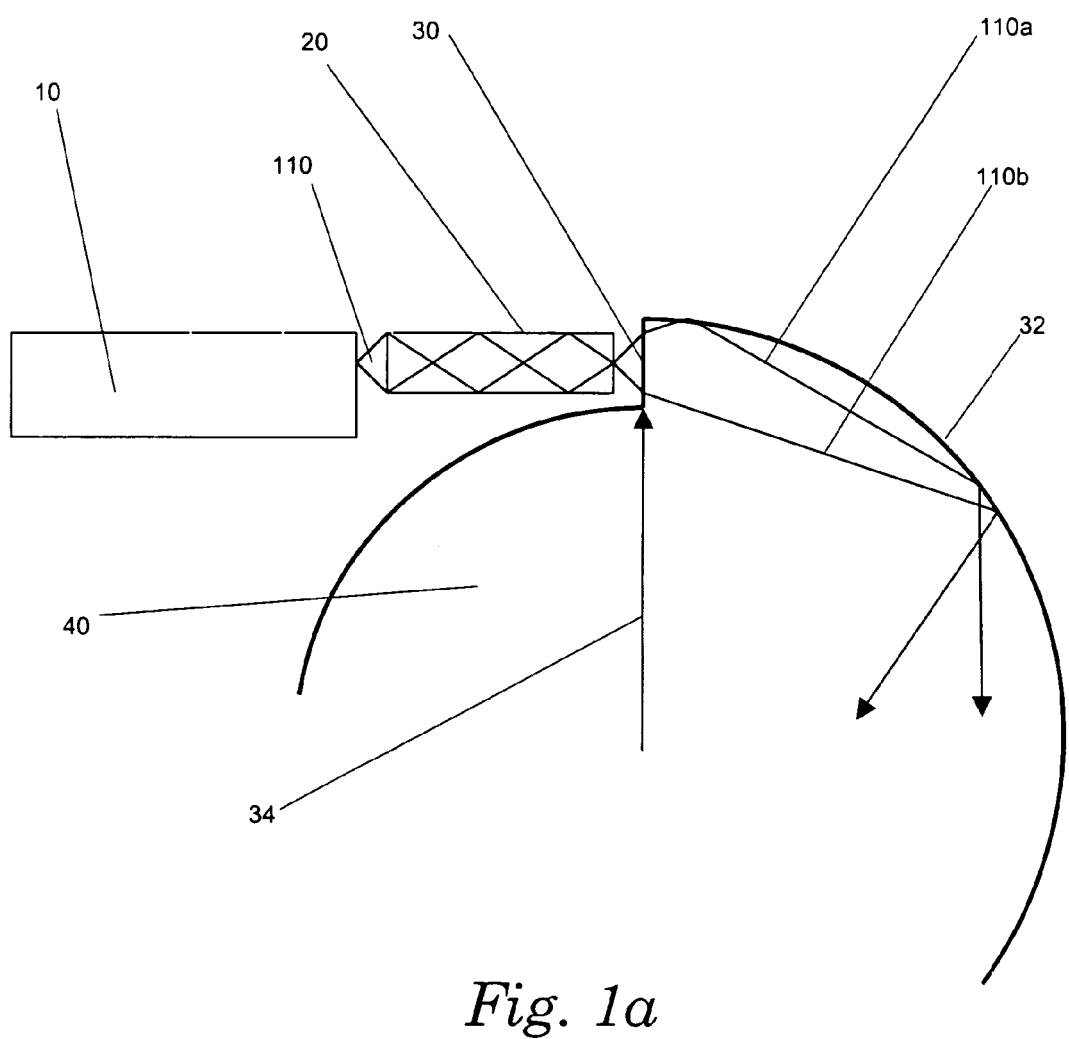
FIG. 1a is a schematic cross-sectional view of a diode laser array for pumping a fiber laser.

Referring to FIG. 1a, a high-power diode laser array (10) consisting of multiple high power diode lasers produces laser radiation (110) for pumping the fiber laser (40). The pump radiation (110) is coupled to a planar glass plate (20) that has an index of refraction n>$n_{air}$, so that the laser radiation (110) is efficiently guided from one end of the glass plate to the other end. The pump laser radiation (110) exits the glass plate and enters the fiber (40) through a fiber native window (30) in the fiber (40). Within the fiber (40), the pump laser radiation (110a and 110b) is absorbed by an active material (not shown in FIG. 1) that generates radiation of a characteristic wavelength in response to the pump radiation.

Figure 1B:
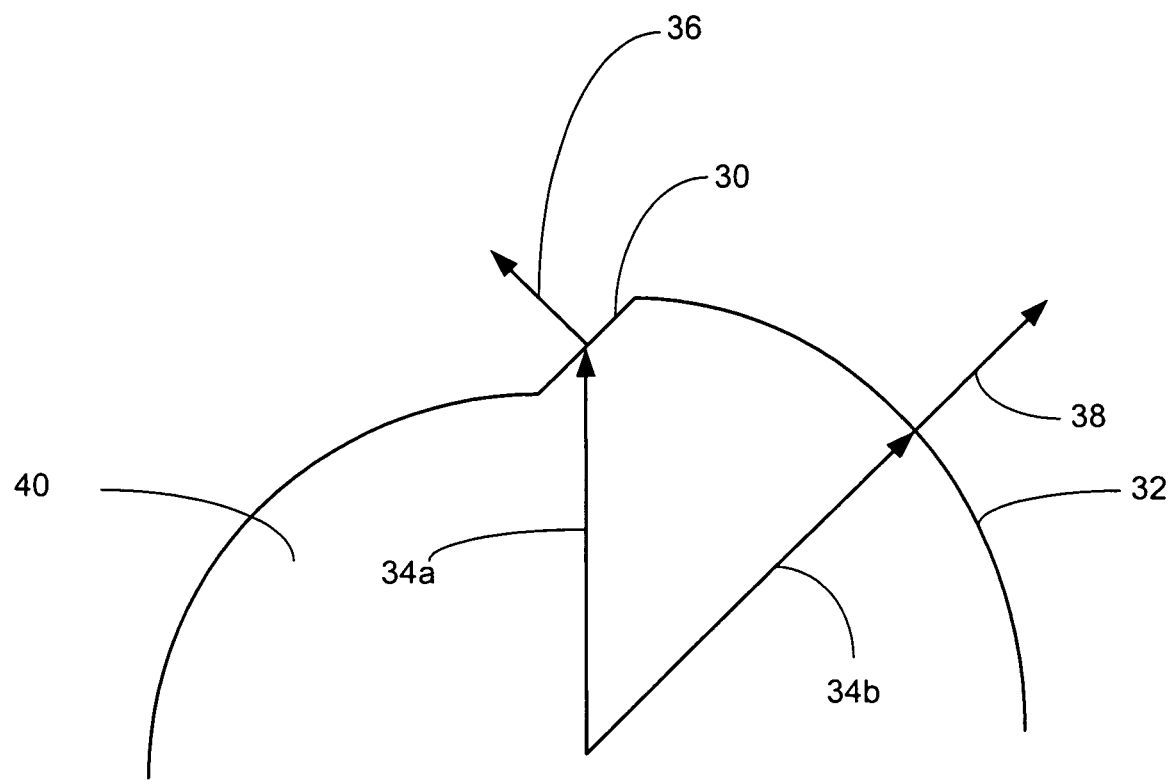
FIG 1b is a schematic cross-sectional view of a diode laser array for pumping a fiber laser.

The fiber native window (30) may be a flat surface that is adapted for receiving radiation from a pump laser that is injected into the fiber (40). Referring to FIG. 1b, fiber native window (30) has a normal axis to its surface (36) that is not parallel to a radial axis (34a) of the fiber that intersects the window (30) at a point on the surface of the window. Thus, the surface of the fiber native window (30) may be generally parallel to a radial axis (34) of the fiber (40), as shown in FIG. 1a. In other words, the window's normal direction (36) may be perpendicular to a radial axis (34) of the fiber that intersects the window (30). However, referring to FIG. 1b, the normal axis (36) of the window (30) need not be perpendicular to a radial axis of the fiber that intersects the window (30). The length of the fiber native window (30) runs substantially along, and substantially parallel to, the longitudinal axis of the fiber (40).

Referring again to FIG. 1a, the pump laser radiation (110a and 110b) is confined within the fiber laser (40) by total internal reflection off the inner curved surface (32) of the fiber (40). Referring now to FIG. 1b, a normal direction (38) at a point on surface (32) may be generally parallel to the direction of the radial axis (34b) that intersects the surface (32) at that point. The normal direction (38) of surface (32) need not be absolutely parallel to the radial axis (34b), and indeed cannot be everywhere parallel to the radial axis if the cylindrical symmetry of the fiber (40) is broken (e.g., by the native window (30)).

Referring again to FIG. 1a, two beams of pump laser radiation (110a and 110b) are shown as they propagate from the high-power diode array (10) into the fiber (40). The divergence of the beams (110a and 110b) inside the fiber (40) is immediately very large and thereby effectively prevents the resonance of local modes that could avoid coupling to localized regions of laser material in the fiber (40).

Figure 2A:
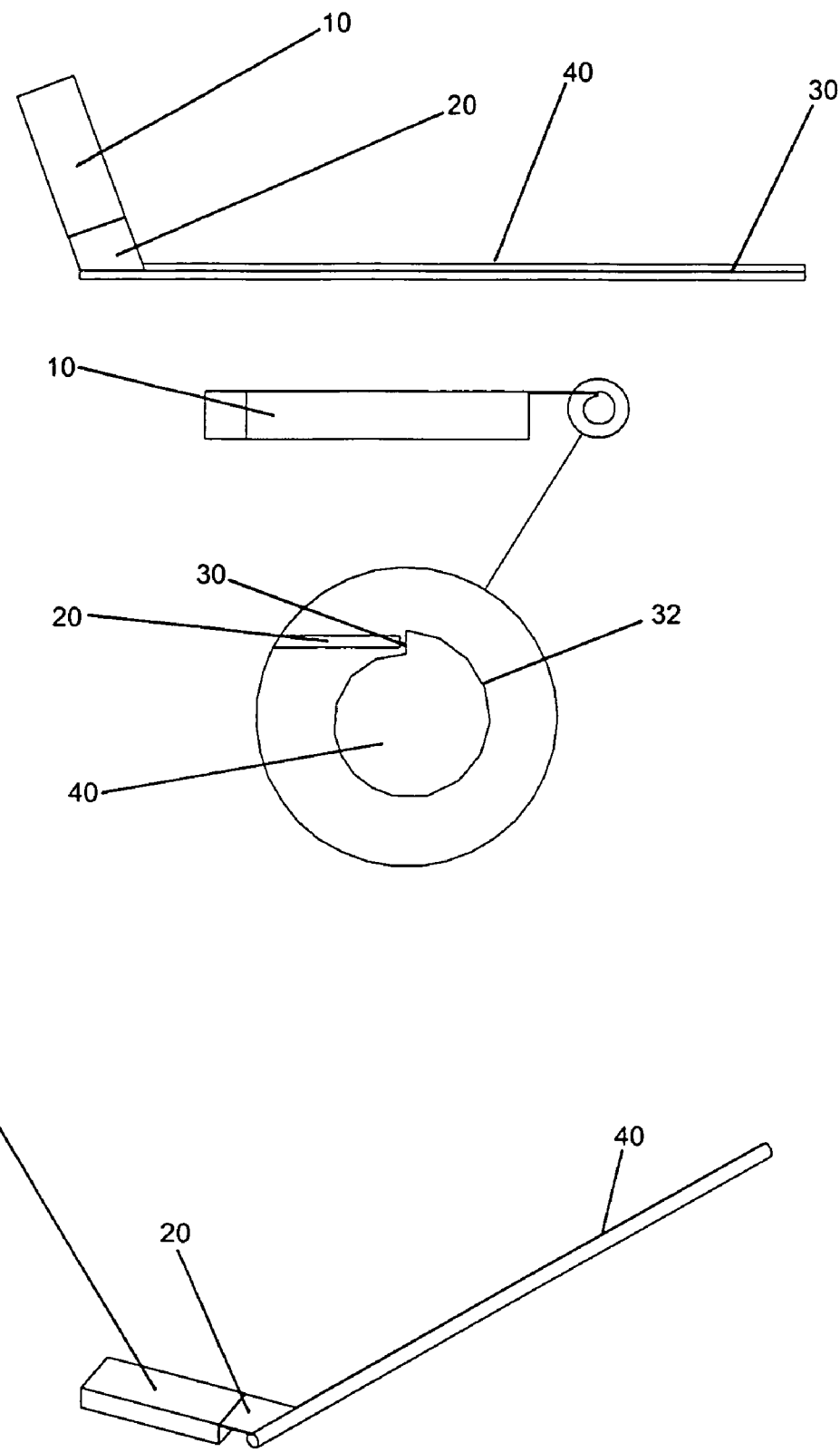
FIG. 2a is a schematic top, side, and isometric view of a diode laser array for pumping a fiber laser.

Referring to FIG. 2a, pump laser radiation from the high-power diode laser array (10) is coupled through a planar glass plate (20) through the native window (30) into a fiber (40). The fiber (40) has an curved surface (32) with a cross-section that is in the shape of a spiral. Such a shape provides a natural position for the native window (30) through which pump radiation (110a and 110b) can be accepted into the fiber (40) and also provides an efficient structure for suppressing local modes of the pump light within the fiber (40). Pump radiation (110a and 110b) is absorbed by laser active material in the fiber that generates radiation having a wavelength characteristic of the active material. The radiation generated by the active material can oscillate along the longitudinal axis of the fiber (40) between two reflectors (e.g., mirrors or gratings) that define a resonant cavity. The characteristic wavelength radiation is amplified because, as the light oscillates within the resonant cavity, the optical gain at the characteristic wavelength is greater than the optical loss.

Figure 2B:
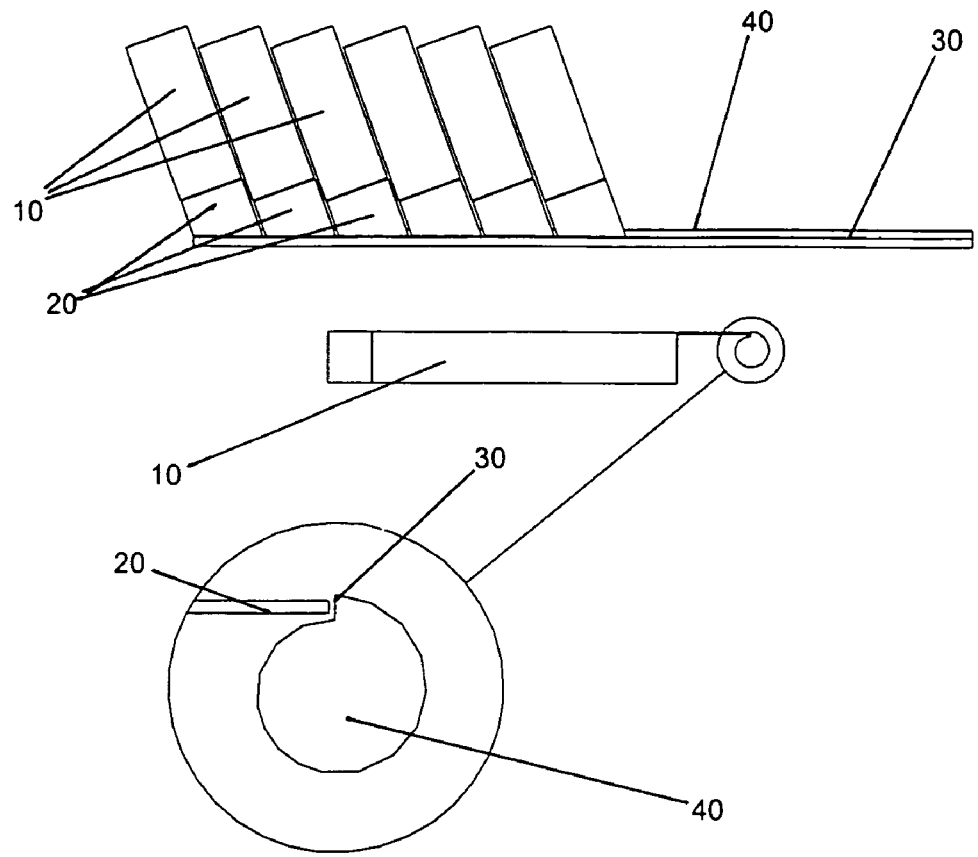
FIG. 2b is a schematic top, side, and isometric view of a multiple diode laser array for pumping a fiber laser.
Figure 2B:
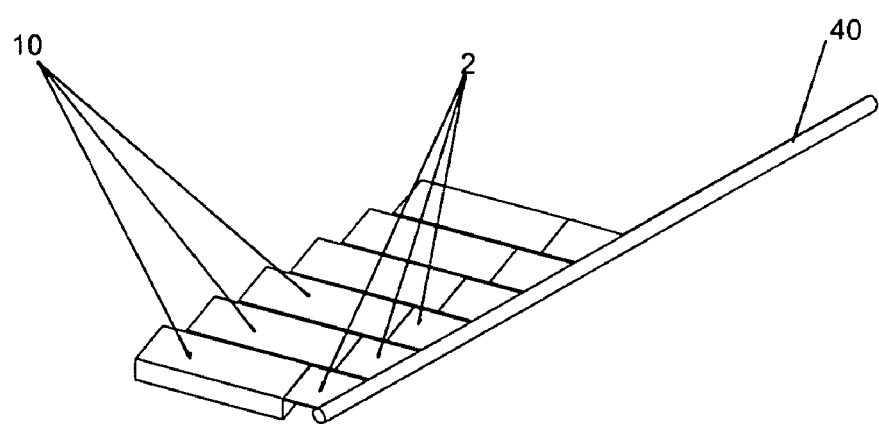

Referring to FIG. 2b, multiple high-power diode lasers or diode laser arrays (10) can couple pump laser radiation through attached planar glass plates (20) and through the native window (30) into a fiber (40). While the high-power diode lasers (10) can be adjacent to each other, this is not necessary. The distance between any two diode lasers can be chosen to best fit the needs of the fiber laser (40).

Figure 3:
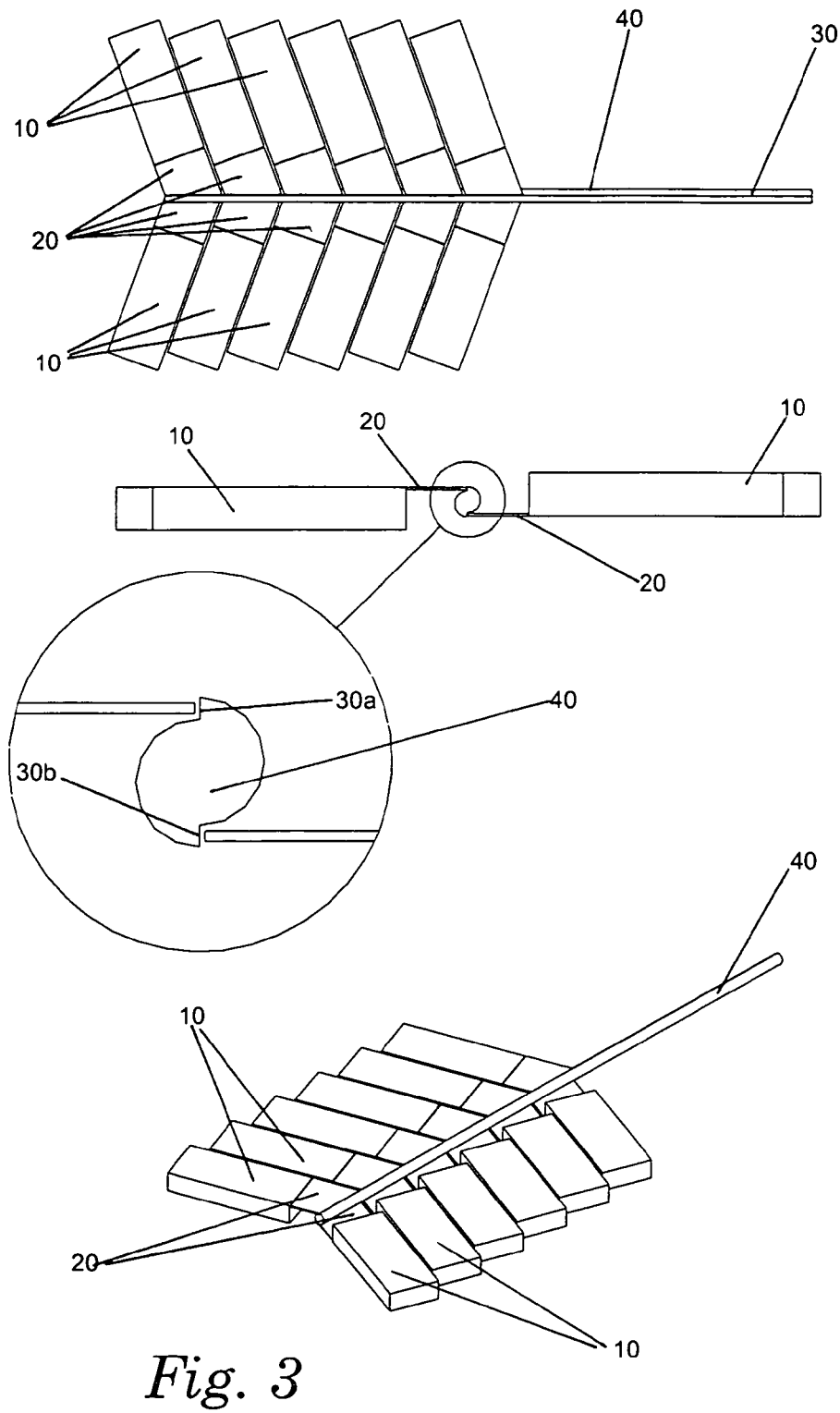
FIG. 3 is a schematic top, side, and isometric view of a multiple diode laser arrays for pumping a fiber laser.

Referring to FIG. 3, multiple high-power diode lasers (10) can couple pump laser radiation through planar glass plates (20), through multiple native windows (30a) and (30b), and into a fiber (40). The fiber (40) can have a cross-section made of two offset semi-circles, thereby naturally forming two native windows (30a) and (30b) and also providing an efficient structure for suppressing local modes.

Fiber (40) may be fabricated using standard techniques known in the art. For example, a preform may be created using a variety of techniques (e.g., by depositing fused-silica soot on the inside wall of a fused-silica tube and then sintering the resultant tube to form a rod; by depositing fused-silica soot on the on the outside of a ceramic rod, cooling the resulting the structure, extracting the rod, and sintering the resultant tube to form a rod; or by vapor axial deposition of fused-silica soot on a pure silica seed rod to form a rod). The preform is cut to the desired cross-sectional shape of the fiber (40) by milling or cutting the preform. For example, a cylindrical preform may be cut in half along its longitudinal axis and the two semi-cylindrical halves may be reattached to each other by sintering the two halves together in an offset position from each other to create the cross section desired in the final fiber. A fiber (40) is then drawn from the preform using known techniques, and the cross-section of the drawn fiber retains the cross-sectional shape of the preform from which it is drawn.

Figure 4A:
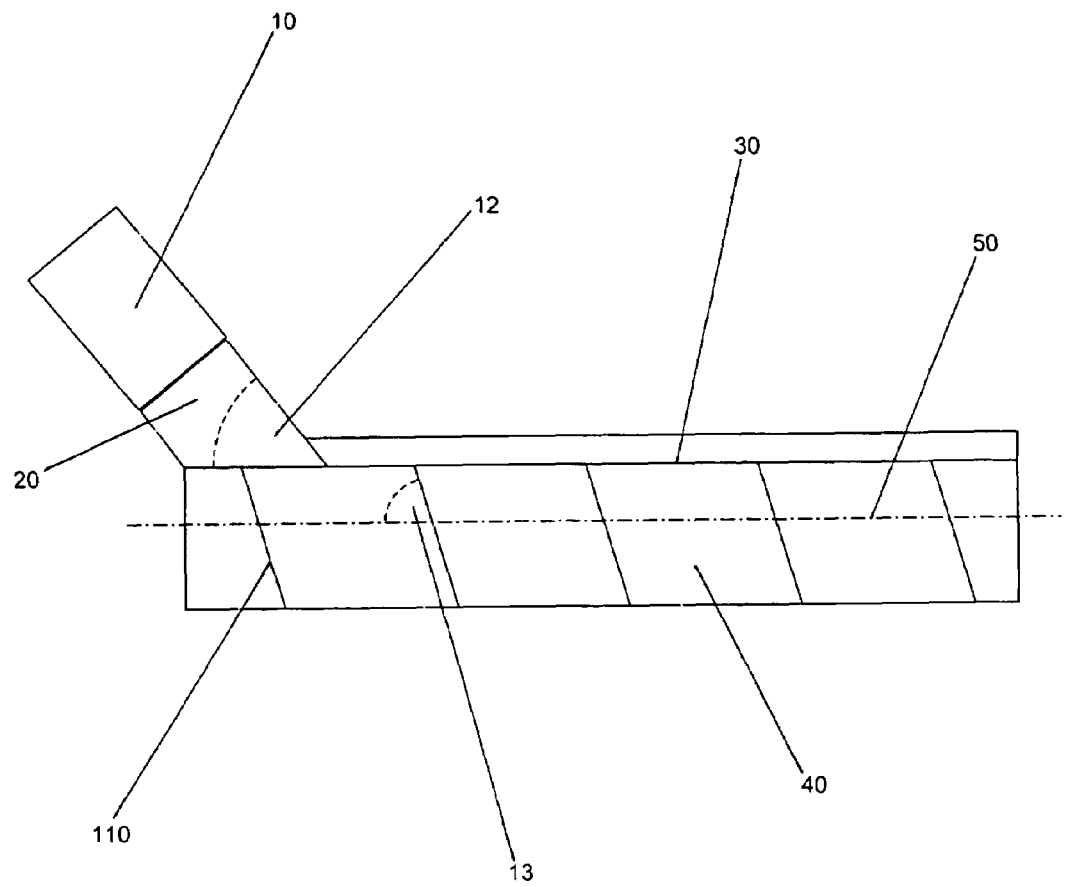
FIG. 4a is a top view of a diode laser array for pumping a fiber laser.

Referring to FIG. 4a, radiation from the high-power diode laser array (10) is transmitted through a glass plate (20) into fiber (40) through one of the native fiber windows (30). The radiation of the high-power diode laser array is injected through the fiber-native window (30) almost tangentially to the otherwise curved fiber surface (32) with a substantial longitudinal component. The radiation from the diode laser (10) is injected in a direction having a component along the longitudinal direction as well as the azimuthal direction of the fiber. Thus, the injected pump beam has radial, azimuthal, and longitudinal components along the axes defined by the fiber (40). The magnitude of the longitudinal component is determined by the angle of injection $\alpha_i$ (12), defined as the angle between the fiber axis (50) and the incident pump beam axis. Also, because the pump light is injected typically from air (index of refraction no) into a fiber material with an index of refraction $n_2>n_1$ the angle of propagation $\alpha_p$ (13) will typically be larger than the angle of injection as shown in FIG. 4a. The angle of propagation $\alpha_p$ (13) is defined as the angle between the helical propagation path of the pump beam radiation (110) and the axis (50) of the fiber (40). Because of the substantial longitudinal component of the pump laser beam and the large divergence in the fast axis of 40–70°, the existence of local modes in the pump radiation that avoid the active material in the fiber laser is unlikely.

Figure 4B:
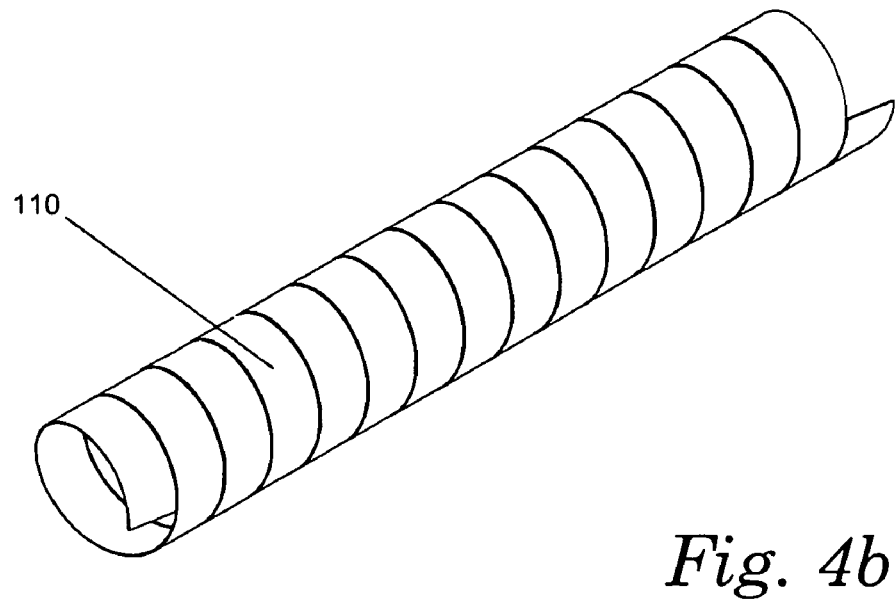
FIG. 4b is a schematic isometric view of the propagation of pump light in a fiber laser.
Figure 4C:
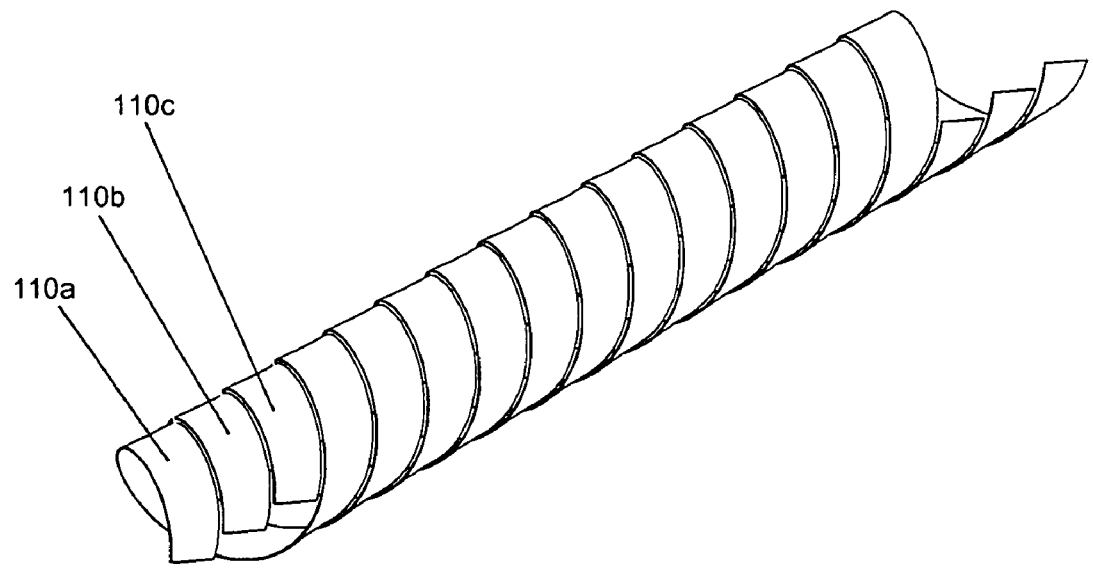
FIG. 4c is a schematic isometric view of the propagation of pump light in a fiber laser.

Referring to FIG. 4b and FIG. 4c, possible relationships between the width of the pump light beam and the slope of the helical propagation path of the pump beam radiation (110) can be seen. However, because of the divergence of the pump light beam in both the vertical and horizontal directions, this figure is not intended to show the actual beam path. It is only utilized to show possible situations for overlap of multiple pump laser beams.

Referring to FIG. 4b, the propagation of a pump laser beam (110) is illustrated where the initial width of the pump laser beam is nearly identical to the helical slope defined by the angle of propagation $\alpha_p$. If a multitude of pump laser beams are injected in such a manner, the multiple beams overlap and therefore increase the intensity within the fiber. Referring to FIG. 4c, for the propagation of multiple pump laser beams (110a, 110b, 110c), the initial width of the pump laser beams is smaller than the helical slope defined by the angle of propagation $\alpha_p$. If a multitude of pump laser beams are injected in such a manner, the multiple beams do not necessarily overlap, and the pump beam intensity can be limited to a desired value. Any ratio of initial width of the pump laser beam and the helical slope defined by the angle of propagation $\alpha_p$ is possible, which allows adjustment of the pump light intensity within the fiber to any desired value.

Figure 5A:
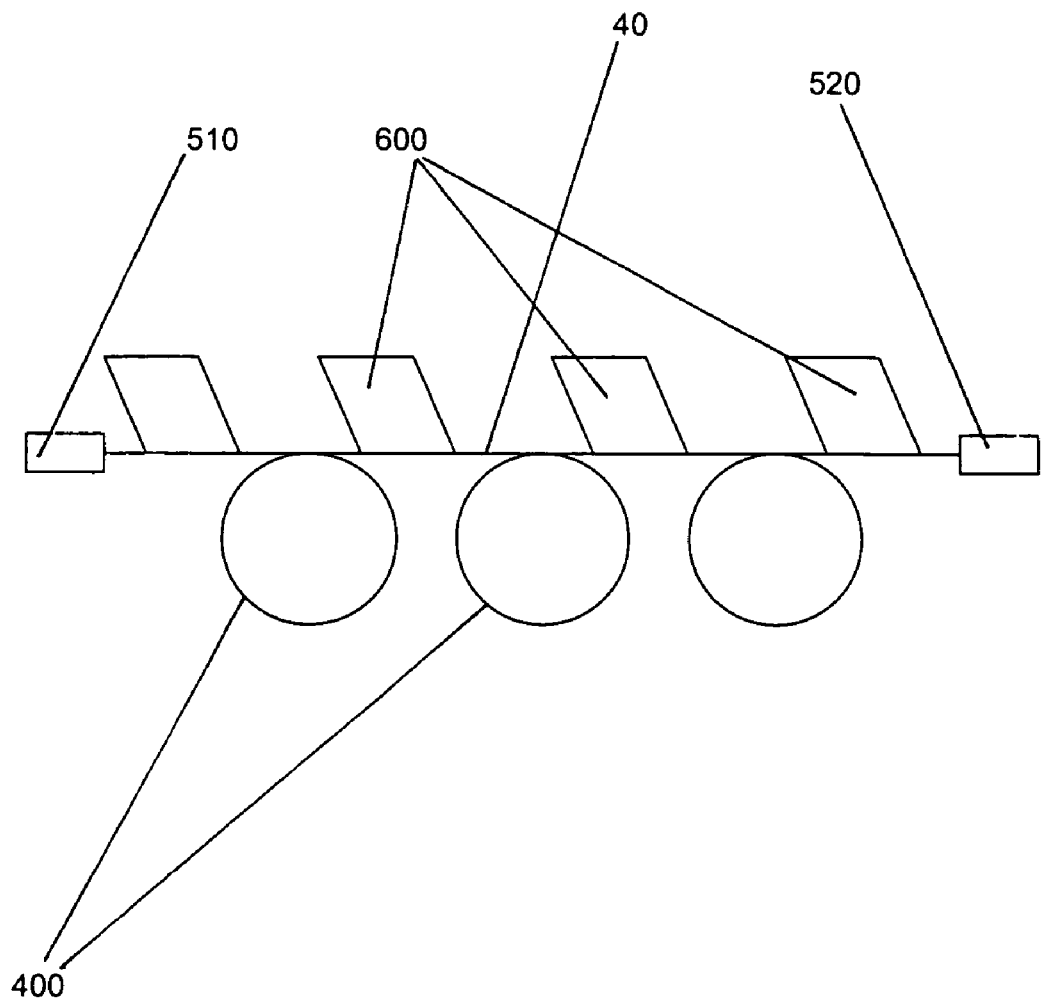
FIG. 5A is a top view of a multiple diode laser arrays for pumping a fiber laser.
Figure 5B:
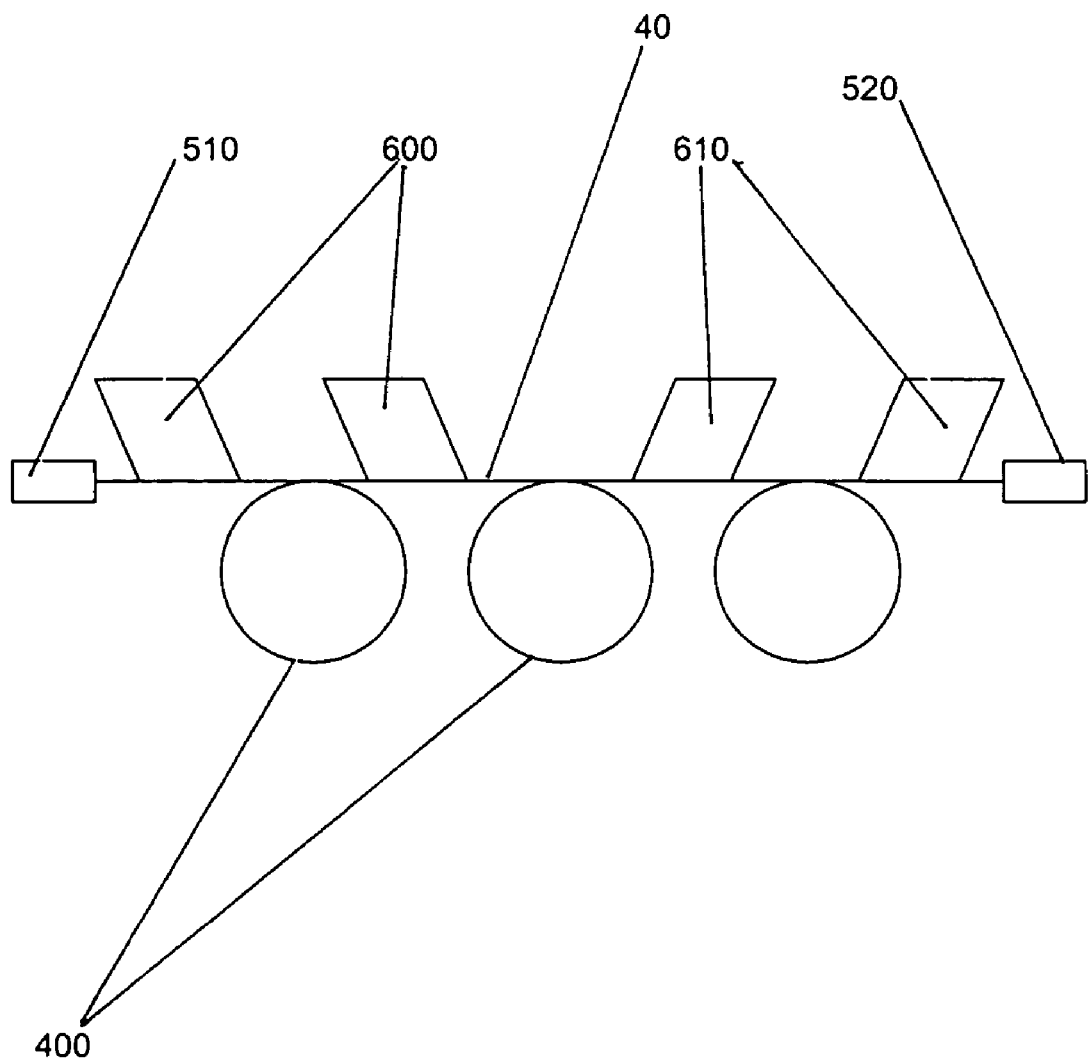
FIG. 5B is a top view of a multiple diode laser arrays for pumping a fiber laser.

Referring to FIG. 5a, a fiber laser consists of a semi-transparent out-coupling mirror (510), a rear mirror (520), a fiber (40) that can be wound up in several sections (400) and that can be side-pumped by a multitude of pump laser assemblies (600). FIG. 5b shows a similar fiber laser as in FIG. 5a, but it is shown that in addition to pump laser assemblies (600) that inject pump power into one longitudinal direction, a multitude of pump laser assemblies (610) can inject pump laser power into the opposite direction.

Figure 6:
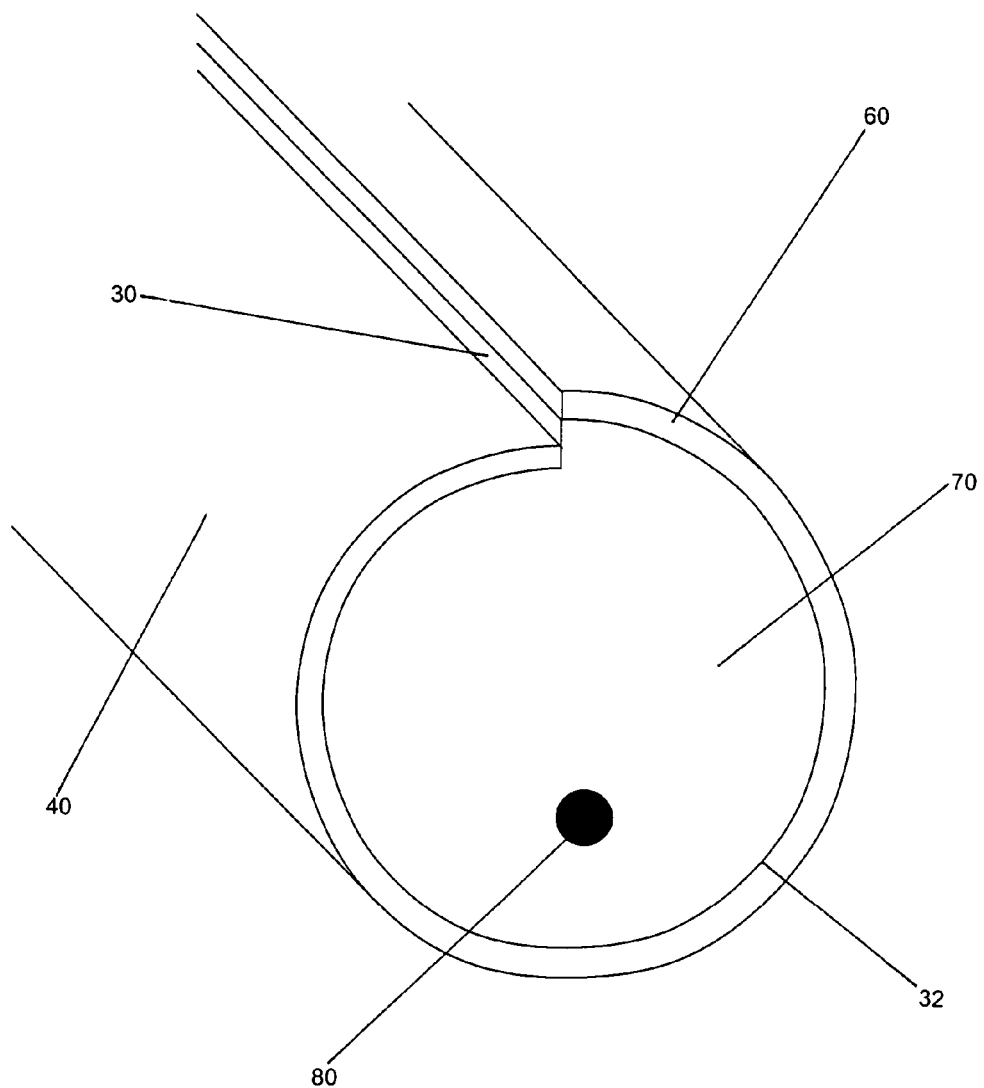
FIG. 6 is a cross-sectional view of a fiber laser that can be side-pumped.

Referring to FIG. 6, a possible configuration of the cross-section of a fiber (40) is shown in which the fiber (40) is efficiently pumped using the above-described methods. A fiber with an surface (32) having a cross-section that is in the shape of a spiral creates a position for the planar native window (30) of rectangular shape. The fiber could consist of a multi-mode waveguide region (70) that either carries only the pump laser light (double clad fiber laser) or carries both the pump laser light and the fiber laser output. One or several active regions (80) can be placed arbitrarily within the multi-mode waveguide region (70) and have any desired shape. Active regions (80) generate radiation at a wavelength characteristic of the active material when they absorb energy. Active regions (80) need not confine or guide the radiation generated in the active regions. Rather, when active regions (80) have a dimension that is small enough compared to the output wavelength of the fiber laser (40), active regions (80) do not confine radiation, and radiation is guided by the entire multimode waveguide region (70) of the fiber (40). An outer cladding (60) can be applied to enhance the confinement of the pump laser radiation and the fiber laser radiation within the waveguide region (70).

The outer cladding (60) can be a homogenous transparent material with an index of refraction $n_3 < n_2$, where $n_2$ is the index of refraction of the multi-mode waveguide region (70), a multitude of concentric cladding layers of materials with different indices of refraction thereby providing a dielectric mirror for the pump laser light, or a metallic mirror.

Figure 7:
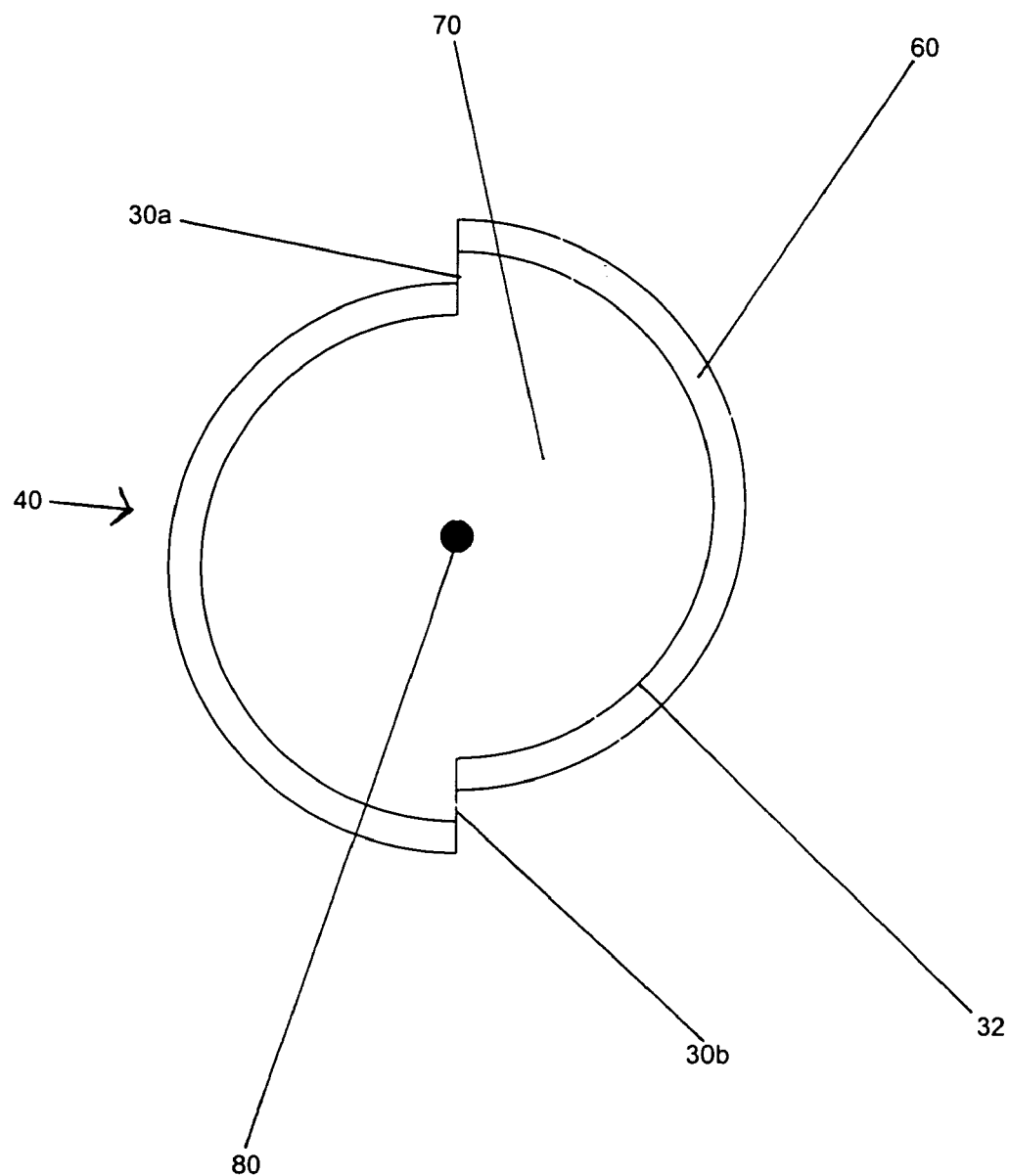
FIG. 7 is a cross-sectional view of a fiber laser that can be side-pumped.

Referring to FIG. 7, a cross-section of a fiber (40) is shown that has an surface (32) that is of the shape of two semi-circles that are slightly displaced and that naturally creates two adjacent planar, rectangular-shaped native windows (30a and 30b) for coupling of the pump laser radiation into the fiber (40). Also shown is the multi-mode waveguide region (70), the active region (80), and an outer cladding (60).

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An optical fiber comprising:
   a radial axis;
   a longitudinal axis;
   a first surface having a normal direction that is not parallel to a direction of the radial axis at the first surface, wherein the first surface is adapted for receiving pump radiation and transmitting the pump radiation into the optical fiber, and wherein the first surface is substantially parallel to the longitudinal axis of the optical fiber at a point where the pump radiation is incident on the first surface;
   a second surface adapted for totally internally reflecting pump radiation received within the optical fiber; and
   an active region within the optical fiber for generating radiation at a characteristic wavelength when pumped with pump radiation.

2. The optical fiber of claim 1, wherein an angle between the normal direction of the first surface and the direction of the radial axis at the first surface is greater than about 15 degrees.

3. The optical fiber of claim 1, wherein an angle between the normal direction of the first surface and the direction of the radial axis at the first surface is greater than about 45 degrees.

4. The optical fiber of claim 1, wherein an angle between the normal direction of the first surface and the direction of the radial axis at the first surface is greater than about 60 degrees.

5. The optical fiber of claim 1, wherein the normal direction of the first surface is substantially perpendicular to the direction of the radial axis at the first surface.

6. The optical fiber of claim 1, wherein the first surface is substantially flat.

7. The optical fiber of claim 1, wherein an angle between a normal direction of the second surface and a direction of the radial axis at the second surface is less than about 30 degrees.

8. The optical fiber of claim 1, wherein a normal direction of the second surface is substantially parallel to a direction of the radial axis at the second surface.

9. The optical fiber of claim 1, wherein the second surface is curved.

10. The optical fiber of claim 1, further comprising a third surface having a normal direction that is not parallel to a direction of the radial axis at the third surface, wherein the third surface is adapted for receiving pump radiation.

11. The optical fiber of claim 10, wherein the third surface is substantially flat.

12. The optical fiber of claim 1, wherein the active region has a transverse dimension smaller than the characteristic wavelength.

13. A fiber laser assembly, comprising:
   (a) an optical fiber comprising:
      (1) a radial axis;
      (2) a longitudinal axis;
      (3) a first surface having a normal direction that is not parallel to a direction of the radial axis at the first surface, wherein the first surface is adapted for receiving pump radiation and transmitting the pump radiation into the optical fiber, and wherein the first surface is substantially parallel to the longitudinal axis of the optical fiber at a point where the pump radiation is incident on the first surface;
      (4) a second surface adapted for totally internally reflecting pump radiation received within the optical fiber; and
      (5) an active region within the optical fiber for generating radiation at a characteristic wavelength when pumped with pump radiation;
   (b) a diode laser array adapted for emitting the pump radiation; and
   (c) an optical element disposed between the diode laser array and the first surface and adapted for guiding pump radiation from the diode laser array to the first surface of the optical fiber.

14. The fiber laser assembly of claim 13, wherein an angle between the normal direction of the first surface and the direction of the radial axis at the first surface is greater than about 15 degrees.

15. The fiber laser assembly of claim 13, wherein an angle between the normal direction of the first surface and the direction of the radial axis at the first surface is greater than about 45 degrees.

16. The fiber laser assembly of claim 13, wherein an angle between the normal direction of the first surface and the direction of the radial axis at the first surface is greater than about 60 degrees.

17. The fiber laser assembly of claim 13, wherein the normal direction of the first surface is substantially perpendicular to the direction of the radial axis at the first surface.

18. The fiber laser assembly of claim 13, wherein the first surface is substantially flat.

19. The fiber laser assembly of claim 13, wherein an angle between a normal direction of the second surface and a direction of the radial axis at the second surface is less than about 30 degrees.

20. The fiber laser assembly of claim 13, wherein a normal direction of the second surface is substantially parallel to a direction of the radial axis at the second surface.

21. The fiber laser assembly of claim 13, wherein the second surface is curved.

22. The fiber laser assembly of claim 13, further comprising a third surface having a normal direction that is not parallel to a direction of the radial axis at the third surface, wherein the third surface is adapted for receiving pump radiation.

23. The fiber laser assembly of claim 22, wherein the third surface is substantially flat.

24. The fiber laser assembly of claim 13, wherein the active region has a transverse dimension smaller than the characteristic wavelength.

25. A method of pumping a fiber laser having a longitudinal axis, a radial axis, and an azimuthal axis, the method comprising:

producing a beam of pump radiation;

injecting the beam of pump radiation into the fiber laser through a surface of the fiber laser and in a direction such that the beam of pump radiation has a component along the longitudinal axis, the radial axis, and the azimuthal axis of the fiber laser, wherein the surface has a normal direction that is not parallel to a direction of the radial axis at the surface, and wherein the surface is substantially parallel to the longitudinal axis at a point where the pump radiation is incident on the surface.

26. The method of claim 25, wherein the beam of pump radiation is produced by a diode laser array.

* * * * *